United States Patent [19]
Zavislan

[11] Patent Number: 5,953,126
[45] Date of Patent: Sep. 14, 1999

[54] OPTICAL PROFILOMETRY

[75] Inventor: James M. Zavislan, Pittsford, N.Y.

[73] Assignee: Lucid Inc, Henrietta, N.Y.

[21] Appl. No.: 08/893,329

[22] Filed: Jul. 16, 1997

Related U.S. Application Data

[60] Provisional application No. 60/028,808, Oct. 17, 1996.

[51] Int. Cl.$^6$ ................................................ G01B 11/24
[52] U.S. Cl. ................................................................ 356/376
[58] Field of Search .................................. 356/371, 376; 250/201.3, 201.4, 201.5

[56] References Cited

U.S. PATENT DOCUMENTS

| | | | |
|---|---|---|---|
| 3,715,165 | 2/1973 | Smith | 356/371 |
| 3,807,029 | 4/1974 | Troeger . | |
| 4,355,904 | 10/1982 | Balasubramanian | 356/376 |
| 4,359,282 | 11/1982 | Garrison | 356/376 |
| 4,579,454 | 4/1986 | Kleinknecht | 356/376 |
| 4,629,324 | 12/1986 | Stern | 356/376 |
| 4,732,485 | 3/1988 | Morita et al. | 356/376 |
| 4,748,335 | 5/1988 | Lindow et al. | 356/376 |
| 4,798,469 | 1/1989 | Burke | 356/376 |
| 4,806,777 | 2/1989 | Ulbers et al. | 356/376 |
| 4,844,617 | 7/1989 | Kelderman et al. | 356/376 |
| 4,965,441 | 10/1990 | Picard | 250/201.3 |
| 5,270,560 | 12/1993 | Cheng | 356/376 |

OTHER PUBLICATIONS

Philips International, Compact Disc Technology, 1991.
Compact Disc Digital Audio, Customers Specifications CDM–9, Revision 1.0, Oct. 29, 1991.

*Primary Examiner*—F. L. Evans
*Attorney, Agent, or Firm*—Harris Beach & Wilcox, LLP.

[57] ABSTRACT

A scanning reflection profilometry system utilizes an objective lens which focuses a beam at the surface under test and measures the profile of the surface (its height variations) in accordance with the amount of defocus of the reflected beam. Surface profile distortion which is focus dependent is reduced through the use of a transparent mask over the aperture of the lens in the path of the beam which is incident on and reflected from the surface under test and which covers a portion but not all of the aperture. A photodetector upon which the reflected beam is incident provides output signals representing the change in profile. The system has height sensitivity characteristic of a small spot size on the surface without signal distortion attributable to the diffraction anomalies associated with small spot sizes. A microprofilometer head having the objective lens and other optics is mounted on flexures and driven to execute reciprocal movement so as to scan the surface under test.

19 Claims, 10 Drawing Sheets

SPOT SHAPE

OPTICAL PROFILOMETRY

DESCRIPTION

This application claims priority benefit of U.S. Provisional Application Ser. No. 60/028808 filed Oct. 17, 1996.

The present invention relates to profilometry system and particularly to a scanning optical profilometer for surface profile (topography) measurement. The invention provides an improved microprofiler head which enables surface profile to be measured with high sensitivity (height resolution) for example of the order of 10 nm (nanometers) by overcoming the effects of diffraction resulting from focusing to small spot sizes needed for such height resolution.

In reflection profilometry, the amount of defocus is the measure of the change in height of the surface. Small spot sizes at the focal point of an incident beam have therefore been used. However, such small spots are accompanied by diffraction anomalies due to changes in slope, fissures, and surface texture variations. Thus, the reflected beam and the electrical signal representing the amount of defocus is distorted, and does not accurately represent the position of the surface with respect to the focusing objective lens of the optics of the profilometer head. Generically, the surface due to its texture, surface slope, and other physical characteristics, has a spatial frequency content which interacts with the incident beam and produces a diffracted wavefront, a portion of which is collected by the focusing lens. The wavefront is distorted or modulated by the diffractive effects (diffractive anomalies). The detection of the defocus signal is therefore distorted. Use of a larger spot at the focal point on the surface to avoid diffractive anomalies reduces the sensitivity to defocus and results in reduced height sensitivity (resolution) of the measurement.

It is a feature of the invention to provide in the profiler head, an optical mask which effectively enlarges the spot on the surface being measured to homogenize the light distribution at the detector of the reflected beam. The height sensitivity of the measurement is maintained as though the spot were focused to a diffraction limited spot.

Another feature of the invention is to provide a scanning reflection profilometer in which the microprofilometer head is mounted on flexures and reciprocated, preferably by being electromagnetically driven so as to scan the surface under test thereby enabling the entire scanning system to be miniaturized.

Still another feature of the invention is to enable the use of a microminiature electromechanical/opto-electrical detector of the type used in reading optical storage devices and records such as compact discs (e.g., CD-ROMs) in a microprofilometer for surface profile measurement by eliminating the need for translating an objective lens to counteract defocus and deriving the signal representing the surface profile by measuring the displacement of the objective lens.

In conventional microprofilometers, light from a semiconductor laser is directed on to the object surface (the surface under test or SUT) as a focus spot. A moveable lens suspended in the sensor is continuously adjusted (translated) to ensure that the focal point of the beam is always coincident with the object surface. As a consequence, the laser spot size at the object surface does not vary over the measurement range. Any displacement of the object surface in the direction of the beam causes a displacement of the image of the surface incident spot on a photodetector. The output of the photodetector is then used to control the position of the moveable objective lens. The surface displacement measurement is produced by a measuring system attached to the moveable lens. The following patents are representative of such reflection profilometry systems which operate by measuring the displacement of a moveable lens: U.S. Pat. No. 4,844,617, issued Jul 4, 1989 to Kelderman, et al.; U.S. Pat. No. 4,806,777, issued Feb. 21, 1989 to Ulbers, et al.; U.S. Pat. No. 4,748,335, issued May 31, 1988 to Lindow, et al.; U.S. Pat. No. 4,579,454, issued Apr. 1, 1986 to Kleinknecht; U.S. Pat. No. 4,359,282, issued Nov. 16, 1982 to Garrison; U.S. Pat. No. 4,355,904, issued Oct. 26, 1982 to Balasubramanian; and U.S. Pat. No. 3,715,165, issued Feb. 6, 1973 to Smith.

Briefly described, a microprofiler head embodying the invention utilizes a transparent mask which covers and leaves uncovered different portions of the aperture of the lens on diametrically opposite sides of the optical axis thereof. This is the lens which focuses and forms the spot on the surface under test (as an objective lens). Thus, different parts of the beam, which pass through covered and uncovered parts of the aperture, are focused on opposite sides of a mean position of the surface (object position). The spot size at the mean position is larger than the size of the spot at the foci due to the covered and uncovered portions of the lens. The numerical aperture (NA) of the system is not changed by virtue of the mask. Since the changes in waveform curvature represent the defocus due to the variations in profile of the beam and such changes are a function of the numerical aperture, the sensitivity of the optics to changes in the profile are not affected even though the spot size is effectively larger at the surface of the object. This may be seen mathematically by the equation $$\Delta\Phi = NA^2 \frac{z}{2}$$

where $\Delta\Phi$ represents the change in the phase of the wavefront and z is the position of the reflecting surface under test (SUT). When no aperture mask is used, the wavefront curvature at the SUT is zero. With an aperture mask the radius of curvature at the position of the surface under test (the mean position between the foci due to the covered and uncovered portions of the objective lens) is, in the sagittal plane, equal to the numerical aperture squared divided by 2R where R is equal to $$1/2 \frac{(n-1)}{n} t$$

where n is the index of refraction of the mask in the covered portion of the lens and t is the thickness of the mask in the direction of the beam incident on the surface under test.

The head may use a laser, beam splitter which deflects the reflected beam, a collimating lens and the objective lens covered by the aperture mask, all disposed along the optical axis of the system. Except for the mask, the optics may be similar to what is used in a CD-ROM detector head. The optics and the head is an assembly which is preferably mounted on flexures and reciprocated to scan the surface under test.

The foregoing and other objects, features and advantages of the invention as well as presently preferred embodiments thereof, will become more apparent from a reading of the following description in connection with the accompanying drawings in which.

Figure 1:
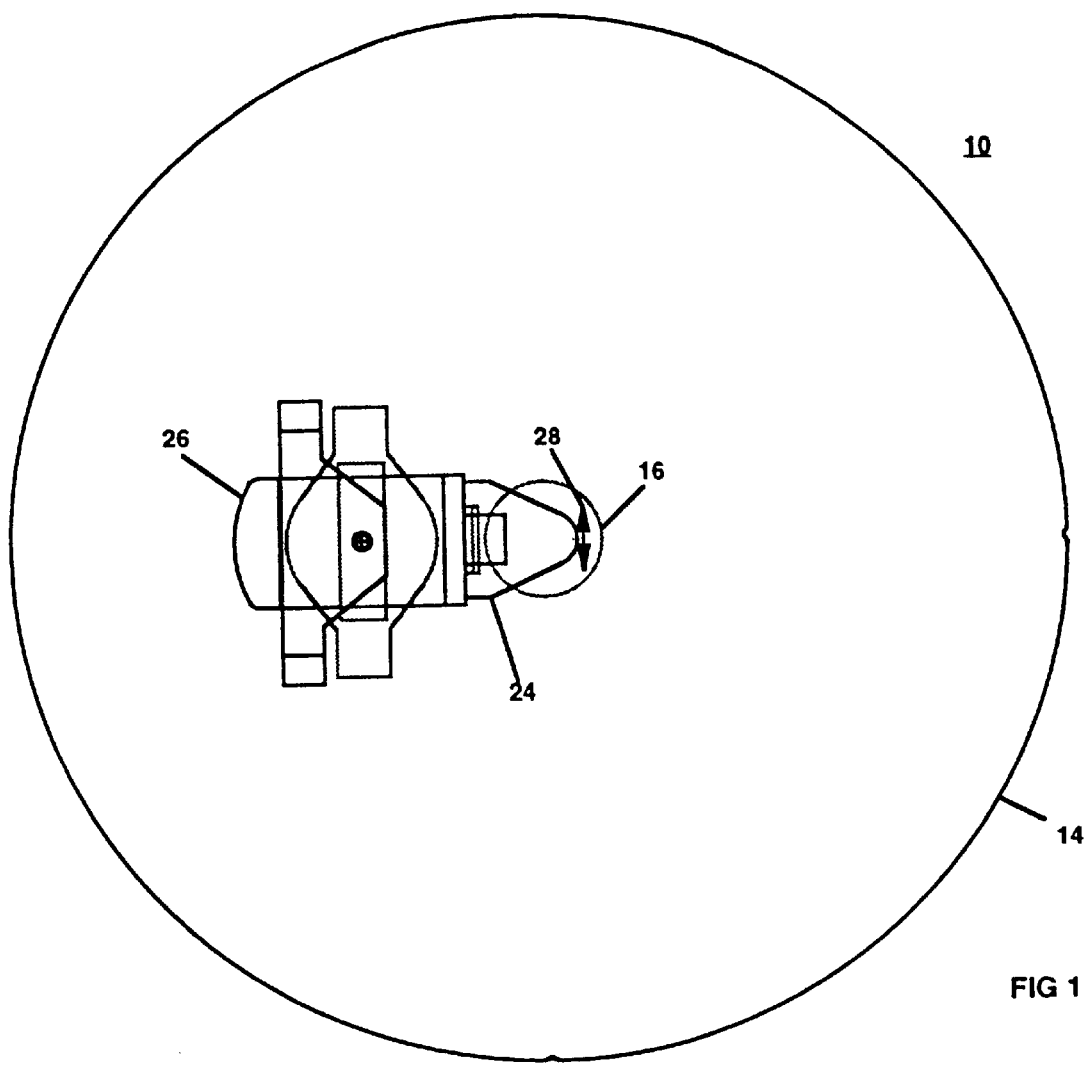
FIG. 1 is a plan view of a microprofilometer assembly embodying the invention.
Figure 2:
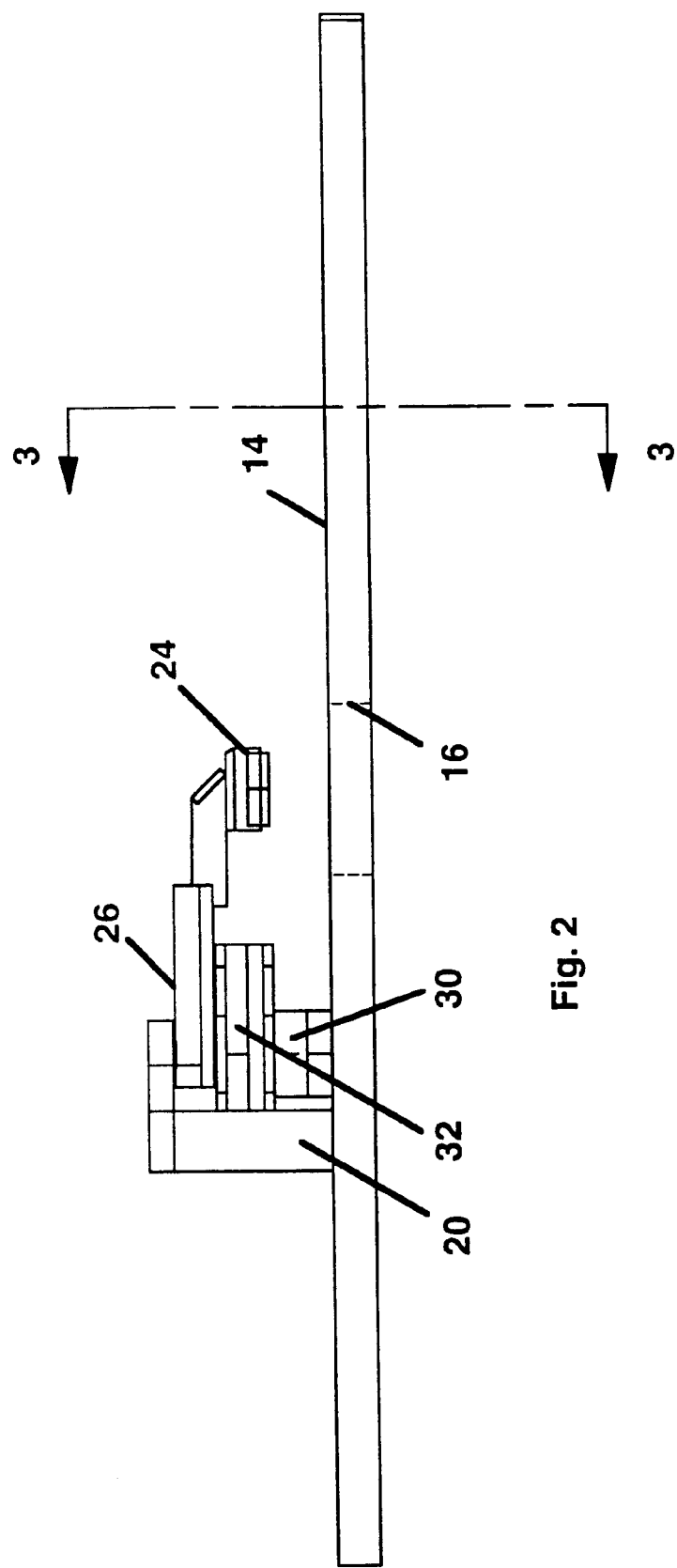
FIG. 2 is a elevational view of the assembly shown in FIG. 1 disposed on top of a surface under test.
Figure 3:
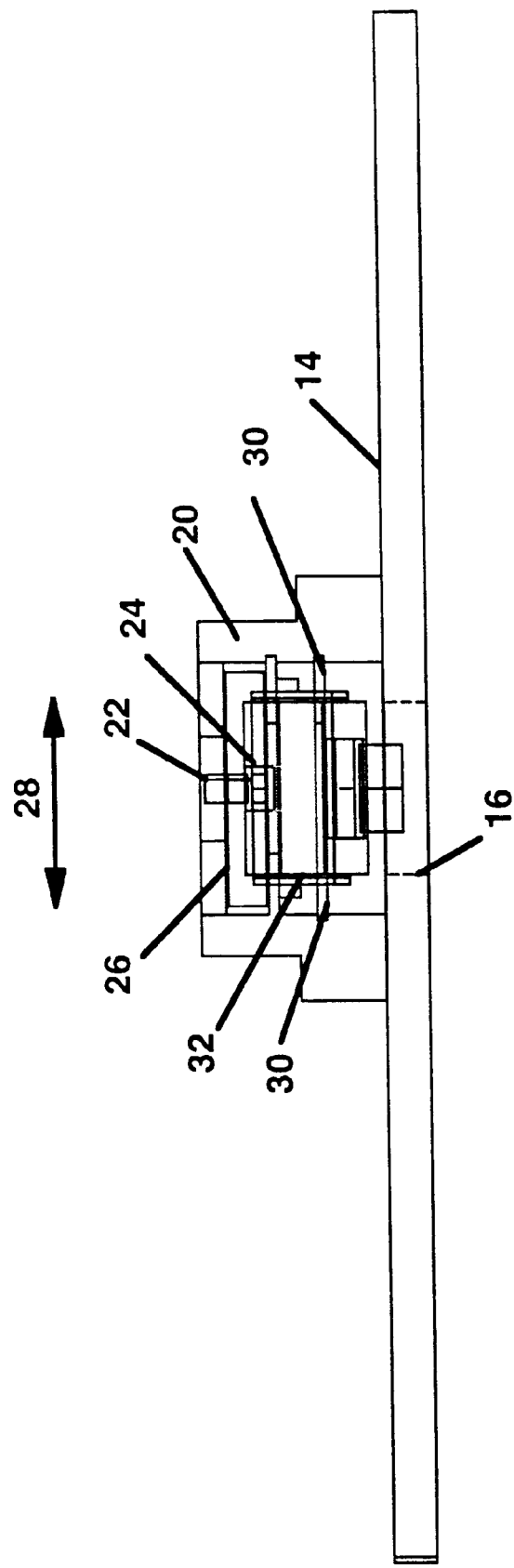
FIG. 3 is an elevational view taken along the line 3—3 in FIG. 2 showing the flexure mounts for the microprofiler head and the means for reciprocating the head to scan the surface under test.

Referring to FIGS. 1, 2 and 3, there is shown a microprofiler assembly 10 for measuring the profile of a body (not shown) which presents the surface under test (SUT). The assembly has a circular mounting plate 14 with a central aperture 16. The plate 14 has legs (not shown) which sets the assembly 10 on the SUT. Posts 20 are attached to the upper surface of the plate 14 has rotary flexure bearing 22 as described in U.S. Pat. No. 3,807,029 issued Apr. 30, 1974 to Troeger which supports a carrier plate 26. The microprofiler head 24 is mounted on the carrier plate 26. The carrier plate 26 is connected to the posts 20 by the flexure 22. The head 24 and plate 26 are reciprocal in the direction of the arrows 28 so as to move the head 24 across a generally linear path over the aperture 16 so as to scan the SUT. An electromagnetic driver consisting of a coil 30 to which alternating current is applied, attracts magnets or bodies of magnetic material 32 on the flexure 22 so as to reciprocate the head 24. The reciprocating motion of the head may be damped by an eddy-current damper (not shown) mounted on the post 20 which interacts with conductive elements on the plate 26. The assembly may be moved manually or may be mounted on a carriage which is moveable in a direction orthogonal to the scanning direction 28 for scanning successive lines on the SUT. Instead of a manually moveable mechanism, an x-y stage may be used to carry and scan the head 24. However, the use of flexures for scanning the had 24 is preferred.

In the event that a map of the surface is desired, the signal from the photodetectors and signals which drive the flexural mount so as to scan the head or from a stage may be digitized and processed by programs similar to those used in profilometers and scanning probe microscopes so as to plot the topography, thereby forming an image of the profile or topography of the surface under test.

Scanning of the head is made practical, since during scanning the objective or focusing lens 34 (FIG. 4) which focuses the scanning spot on the SUT, is not moved. Defocus or the variation in curvature of the wavefronts which represents the profile of the SUT during scanning, is measured by means of an opto-electrical system including a photodetector 36.

The microprofiler head is, except for the aperture mask provided by a transparent plate 38, a commercially available CD-ROM reading head. Presently, the CDM9 sold by Philips International B.V., whose address is 5600 JB Eindhoven, The Netherlands, is used. This head is described in product literature published by Philips in 1991.

Figure 7:
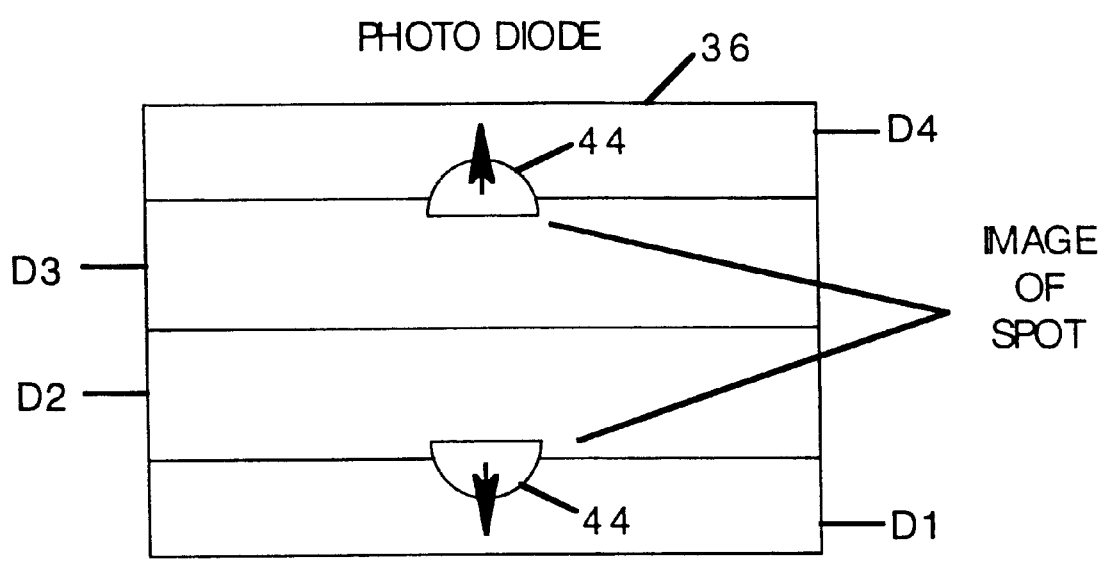
FIG. 7 is a view of the photodetector of the head (PD)

Referring again to FIG. 4, the head 24 has a laser 14 which is mounted on a substrate, adjacent to which is disposed a photodetector 36. This is a multi-element strip line photodetector having an array of diode sections D1, D2, D3 and D4 which is illustrated in FIG. 7. The image of the spot which is reflected from the SUT is formed on the detector, and, as the surface under test is scanned, the reflected spot at the photodetector is defocused and moves in the directions of the arrows 44. The diode array elements D1 to D4 are connected so that their outputs sum and subtract to provide a signal which represents the profile, specifically, the change in Z dimension between the objective lens 34 and the SUT along the optical axis 46.

The laser 14 may be a laser diode, suitably, the model LTOH30M, which is commercially available from Sharp Electronics. Its outlet port is at the focus of a collimating lens 48. A holographic bi-prism 50 is disposed adjacent to the laser and photodetector. This prism has a hologram on the face thereof. The hologram passes the zeroth order of the transmitted laser beam and deflects the retroreflected beam on to the sensitive surface of the photodetector array 36, as is indicated by the dashed lines having arrowheads in the transmission retroreflection direction.

A voice coil type annular electromagnet assembly 52 flexurally or spring mounts the objective lens 34. The voice coil translates the lens to set the nominal position of the lens to bring the mean focus at the SUT. This is the coarse focus of the system and this focus is locked prior to scanning by mechanical means or by maintaining the current in the voice coil.

Figure 6:
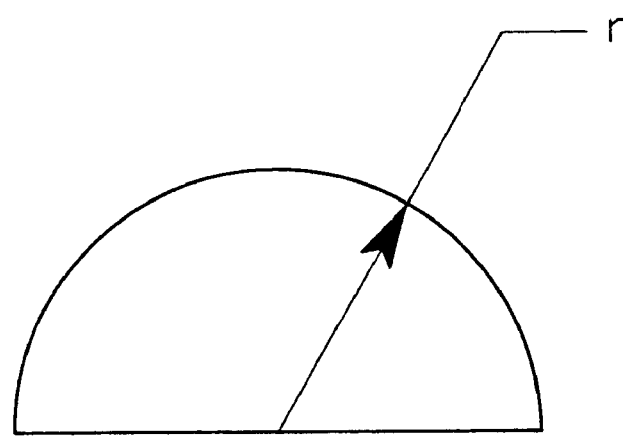
FIG. 6 is a very much enlarged view of the spot formed, using the mask of FIG. 5, by the optics on the surface under test at the object position, the view being enlarged to illustrate the spot's shape.

The aperture mask 38 is a hemicircular parallel plane plate of glass, effectively a knife edge of glass, having a thickness and index of refraction which moves the focus F2 to the far side of the object position (in the plane of the SUT). The focus through the clear part of the mark 38 is indicated as F1. The mean position is the object position, between the focii F1 and F2. The aperture mask may be mounted in the barrel 54 which carries the objective lens 34 and defines the aperture thereof. Because the object position is midway between the foci F1 and F2, at the spot shape at the object position is hemicircular as shown in FIG. 6 and has a radius r. This spot shape is large enough in area to avoid diffractive anomalies much like a spot formed with a lens having a much lower numerical aperture. However, overall sensitivity is maintained and high resolution measurements are made possible because the detector sees change in focus of the actual numerical aperture. In other words, the numerical aperture of the system does not change by virtue of the transparent plate or aperture mask 38.

Figure 8:
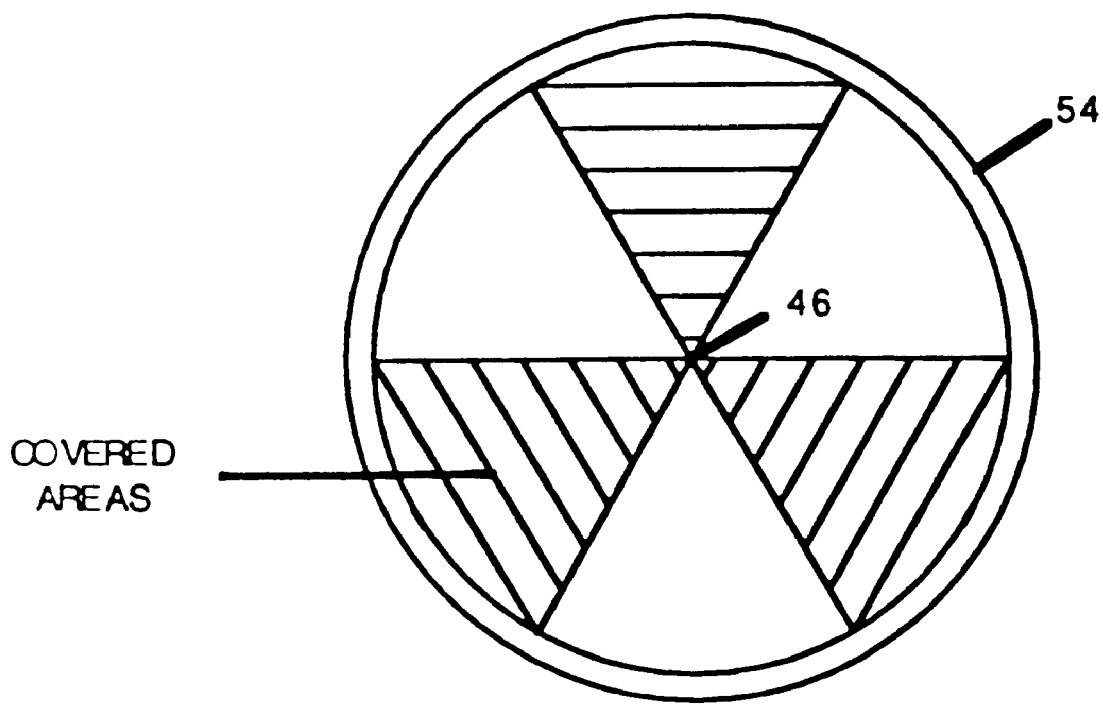
FIG. 8 is a view similar to FIG. 5 showing a triad aperture mask which may be used in lieu of the mask illustrated in FIG. 5.
Figure 9:
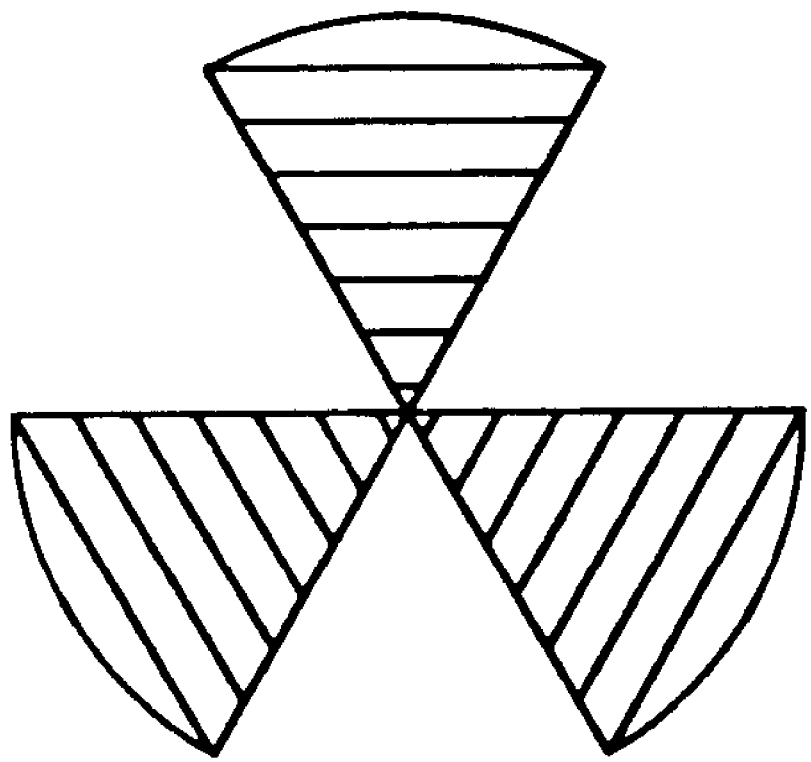
FIG. 9 is an enlarged view of the spot formed by the system using the mask of FIG. 8 at the object position on the surface under test.

Referring to FIGS. 8 and 9, another embodiment of the aperture mask is shown. This mask is made up of three sectors of a circle in its covered areas. Each segment is diametrically opposite (with respect to the optical axis at the center of the aperture) to a clear segment. The hemicircular mask shown in FIG. 5 and the mask shown in FIG. 8 illustrate that the arrangement of covered and clear areas may be any arrangement where the covered and clear areas are anti-symmetric about the optical axis 46. The spot shape obtained from the triangular sectored mask at the object position is illustrated in FIG. 9.

Figure 4:
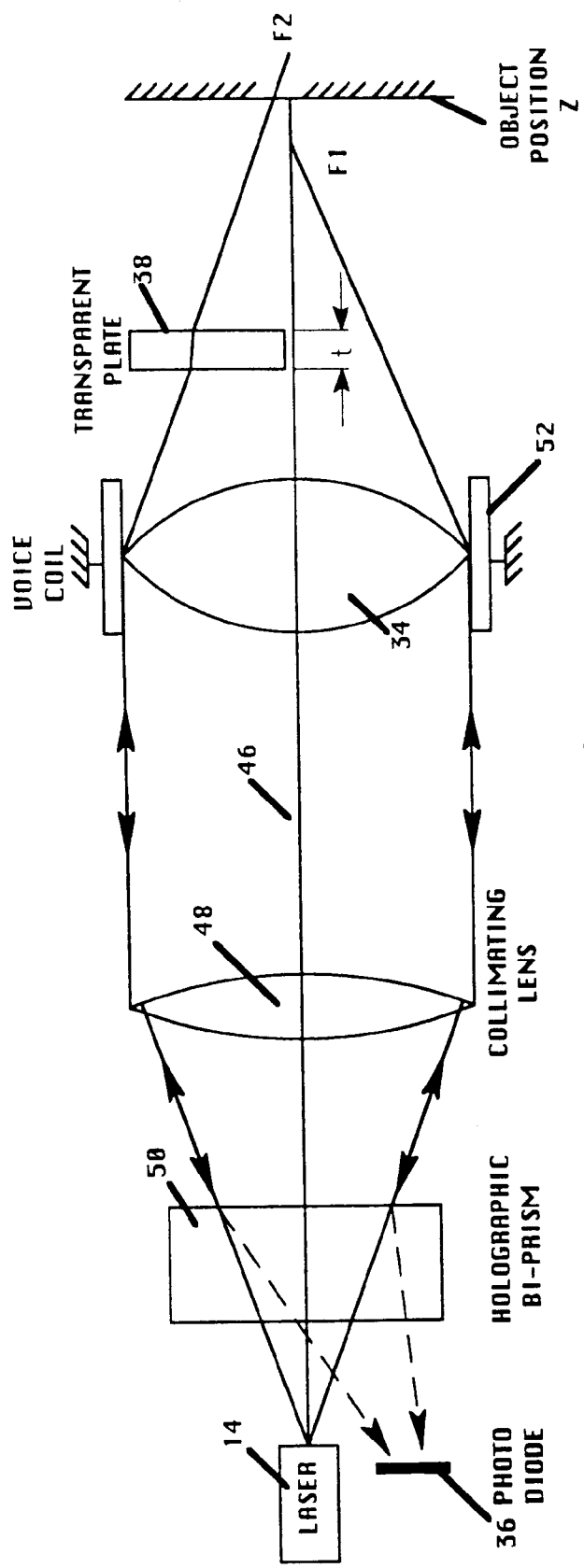
FIG. 4 is a schematic diagram of the optics of the microprofiler head shown in FIGS. 1 to 3.
Figure 10:
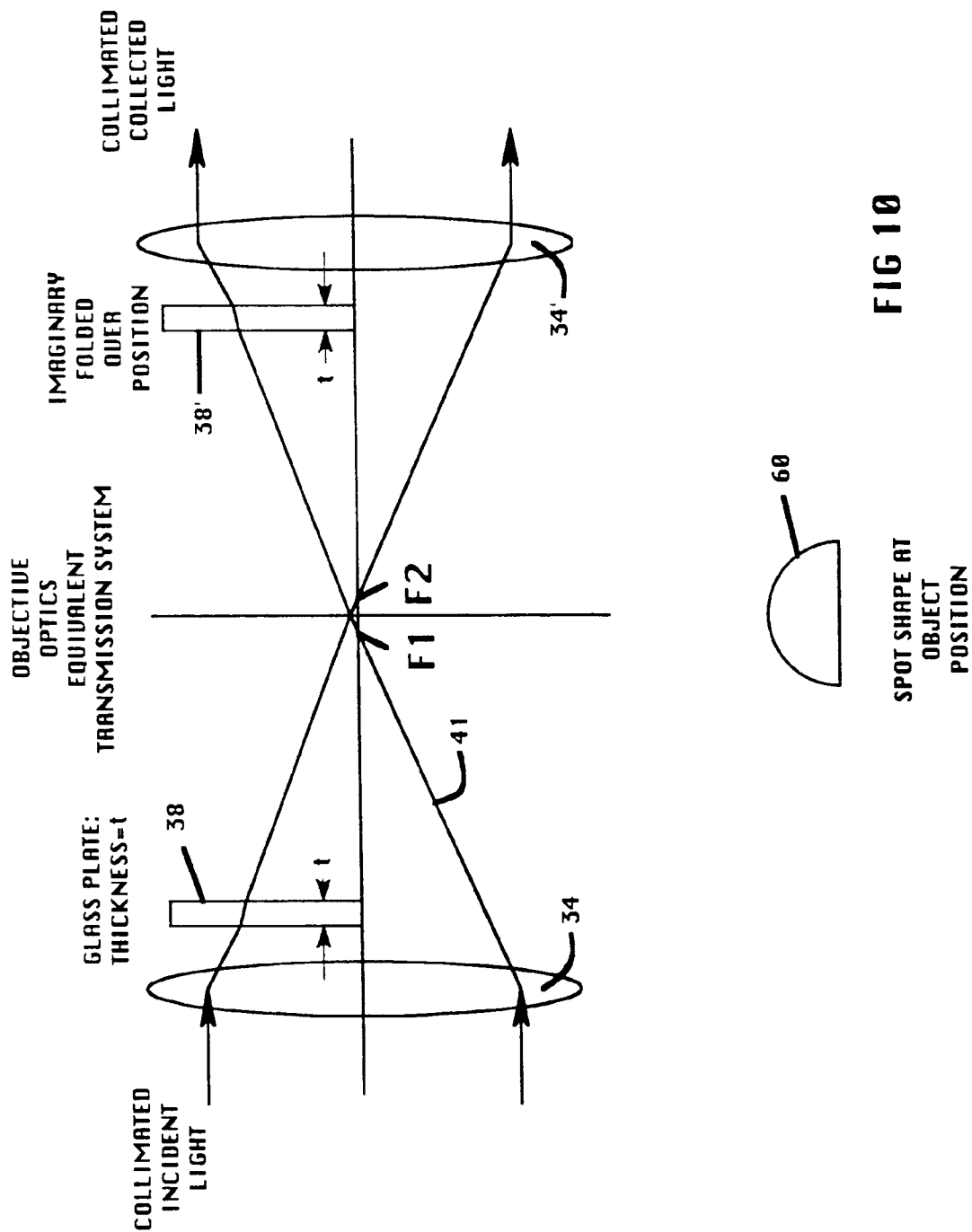
FIG. 10 is a schematic diagram illustrating an equivalent transmission system of the objective lens and aperture mask, the transmission system being the equivalent to the reflective system illustrated in FIG. 4.

Referring to FIG. 10, there is shown, for purposes of illustration and explanation, a transmission system which is equivalent to the reflective optical system shown in FIG. 4.

Figure 5:
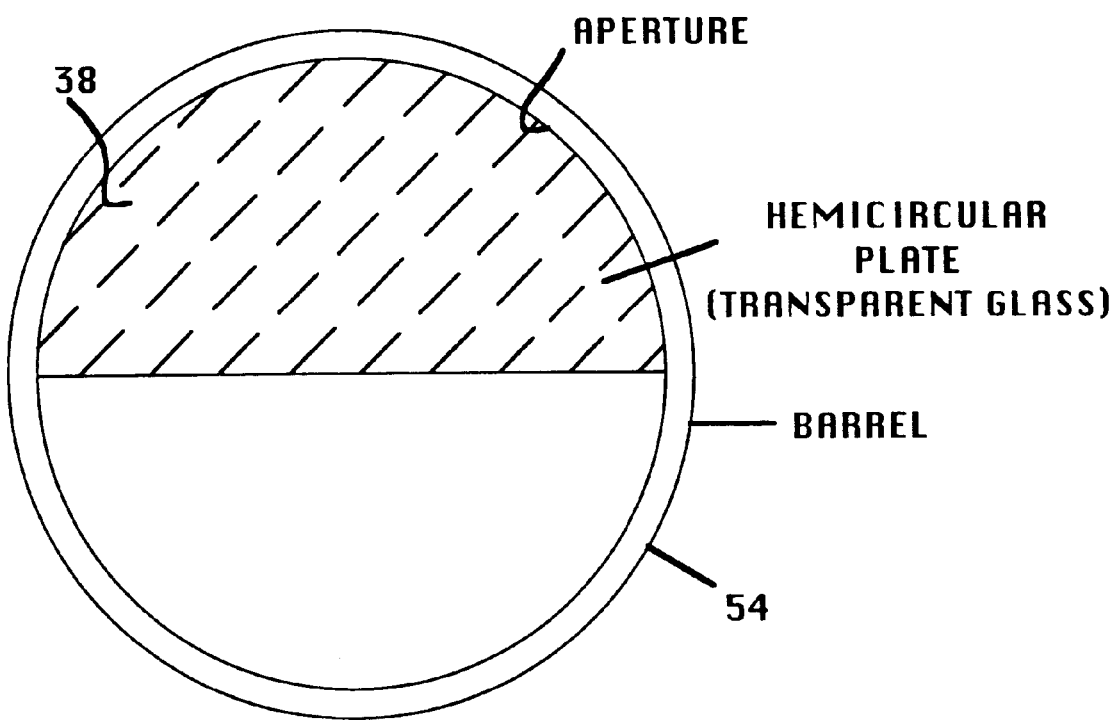
FIG. 5 is a end view of the barrel which defines the aperture of the objective lens of the microprofiler head illustrating the aperture plate (mask) in accordance with one embodiment of the invention.

The aperture mask is the same as illustrated in FIGS. 4 and 5, namely, a parallel plate with thickness t which covers ½ the lens aperture. The light that first goes through the plate 38 (upper rays) is shifted to a focus a distance $[(n-1)/n]t$ away from the light which does not first pass through the plate 38 (lower rays). The longitudinally shifted light upon reflection (FIG. 4) (transmission through the object position in FIG. 10) is incident on the uncovered portion of the lens. This is the uncovered portion of the lens 34' in the transmission equivalent system illustrated in FIG. 10. The uncovered lens part has the optical power to collect and collimate the light from the upper rays 39. The opposite occurs for the lower rays 41. They come to a closer focus F2 and after reflection (transmission in the equivalent transmission system) are incident on the part of the lens 34' which is covered by the plate 38'. The plate 38' and the lens 34' have the optical power to collect and collimate the light transmitted through the object. The optics convert the collimated light into a larger spot at the object position than if the plate were absent. The spot shape at the object position is illustrated in FIG. 10 at 60. It will be apparent from FIG. 10 that the optics, although they convert the collimated light into a larger spot at the object, still collect and collimate the light as if no aperture mask or plate 38 and 38' were present.

The numerical aperture of the lens and the thickness of the plate determines the size of the spot 60 at the object position. For a single plate covering one-half of the lens (a hemicircular plate) the focus spot is a semicircle as shown at 60. The numerical aperture of the lens 34 and the thickness t of the plate 38 determines the size of the spot. For a single plate covering half the lens, the focus spot semicircle has a radius, $r=[(n-1)/(2n)](NAt)$. For example, if the index of refraction n is 1.5 and the numerical aperture is 0.23 for a mask of thickness 0.2 mm, the radius of the semi-circular spot is 7.7 micrometers.

It will be seen that the light which strikes the detector PD is both "inside focus with respect to the object position" as well as "outside focus". Thus, the motion of speckle patterns on the detectors is travelling in different directions. This effect increases the homogeneity of the beam at the detectors. Thus, the optics enlarges the spot on the surface to homogenize the light distribution at the detectors. The system also reduces the contribution of light scattered outside of the specular beam (the reflected beam). The system also maintains the height sensitivity of the profilometer although a large spot is used and the sensitivity is equivalent to a much smaller spot. The system also reduces the sensitivity of the modulation transfer function (MTF) and the power spectrum of the optics to defocus thereby further reducing distortion in the modulation signal produced by the detectors.

From the foregoing description it will be apparent that there has been provided an improved system of profilometry which avoids distortion due to anomalies while maintaining measurement resolution, particularly the height resolution in the measurement of profiles of a surface under test. Variations and modifications in the herein-described system will undoubtedly suggest themselves to those skilled in the art. Accordingly, the foregoing description should be taken as illustrative and not in a limiting sense.

I claim:

1. A microprofilometer having optics comprising a head which focuses a beam on a surface under test via a lens included in said optics, the optics including said lens and said surface under test being stationary with respect to each other in a direction vertically during profile measurements of said surface under test.

2. The microprofilometer according to claim 1 further comprising means for positioning said lens to provide a focus of said lens set at said surface prior to profile measurement and for maintaining said lens and said surface stationary with respect to each other in said direction after being positioned set at said surface while said profile measurements are conducted.

3. The microprofilometer according to claim 2 further comprising means for scanning said surface during said profile measurements.

4. The microprofilometer according to claim 3 wherein said scanning means comprises means for moving said head along a path over said surface.

5. The microprofilometer according to claim 4 wherein said scanning mean comprises a support for said head locatable over said surface, a flexure mounting said head for movement in a direction defining said path, and means for applying force to said head for moving said head with respect to said support along said direction.

6. The microprofilometer according to claim 5 wherein said force applying mean is an electromagnetic actuator attached in part to said head and in part to said support.

7. The microprofilometer according to claim 1 wherein said optics comprises means for dividing light brought by said lens to said surfaces into a plurality of sections, respectively having foci focused beyond and before said surface, and means on which light coming from said sections at said surface is incident for deriving an output representing the height of said surface in profile.

8. A microprofilometer having a profilometer head including optics for focusing an incident beam on a surface under test characterized in that the head is mounted on a flexure and reciprocated so to scan the beam over the surface under test.

9. The microprofilometer according to claim 8 wherein said head is a CD-ROM reading head having an objective lens which projects a beam of light to a focus and a mask which divides said light into foci and on opposite sides of said focus, closer to and further from said lens.

10. An optical profilometer, having an optical system including a lens having an aperture which focuses a spot on a surface under test, the profile of which is to be measured, and light reflected or transmitted therethrough is brought to a photodetector, which comprises an aperture mask including a plate covering a portion of the aperture of the lens, said plate having a given thickness and index of refraction and being disposed in the path of the light via said lens towards the surface under test.

11. The profilometer according to claim 10 wherein the mask provides spots at foci at opposite sides of the surface under test which are smaller than the spot at said surface under test.

12. The profilometer according to claim 10 wherein the radius of curvature of the waveform at said spot on said surface under test in sagittal plane containing said surface under test, is equal essentially to $NA^2/R$ where NA is approximately the numerical aperture of said optical system and R is equal essentially to $$1/2 \frac{(n-1)}{n} t$$

where n is said index of refraction and t is said thickness.

13. The profilometer according to claim 10 wherein said optical system further comprises another lens projecting a beam of said light from a source thereof through said lens which focuses said spot, and means for collecting light which is incident on said surface under test.

14. The profilometer according to claim 13 wherein said light is projected along an optical axis to said collector means, which includes means said for deflecting said light from said optical axis to said photodetector.

15. The profilometer according to claim 14 wherein said deflecting means is disposed between said source and a collimating lens of said system which projects or collects said beam.

16. The profilometer according to claim 10 wherein said mask forms a plurality of portions which are covered and uncovered, which covered and uncovered portions are in anti-symmetrical relationship about an optical axis through said lens.

17. The profilometer according to claim 16 wherein said portions are hemicircular.

18. The profilometer according to claim 16 wherein said portions are sectors of said aperture.

19. The profilometer according to claim 10 wherein said lens is one of a pair of lenses on opposite sides of said surface and said mask is one of a pair of said masks each having said portion therein intercepting relationship with light which does not pass through said portion of the other of said pair of masks, whereby said portions intercept different rays of said light passing through the surface under test.

* * * * *